May 19, 1931.   C. RAMAKERS ET AL   1,805,722
AIRPLANE
Filed June 18, 1929   2 Sheets-Sheet 1
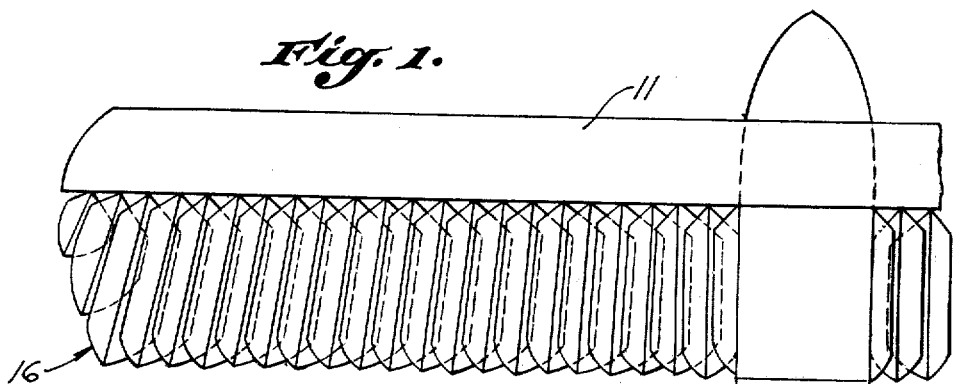
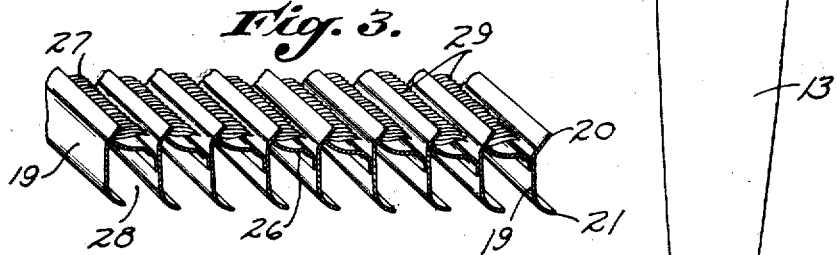
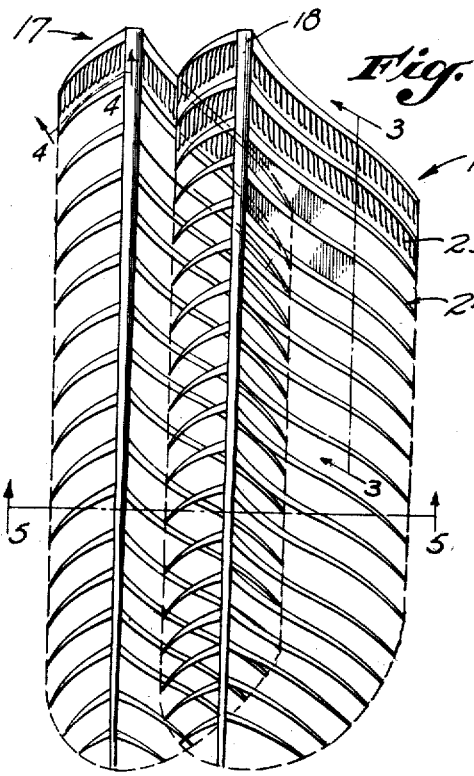
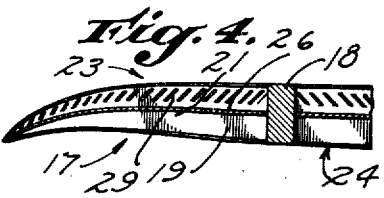
INVENTORS:
Cornelius Ramakers,
David R. Carsley,
BY
ATTORNEY.

May 19, 1931. C. RAMAKERS ET AL 1,805,722
AIRPLANE
Filed June 18, 1929   2 Sheets-Sheet 2
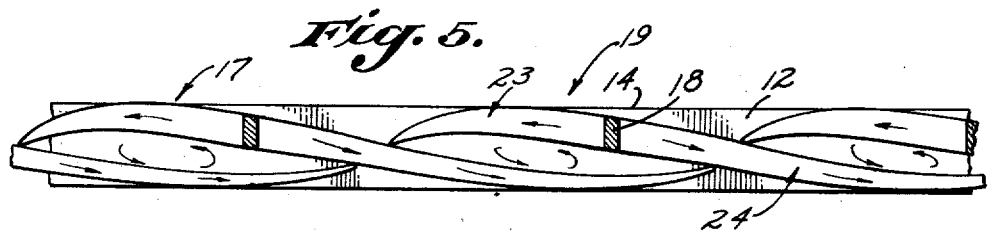
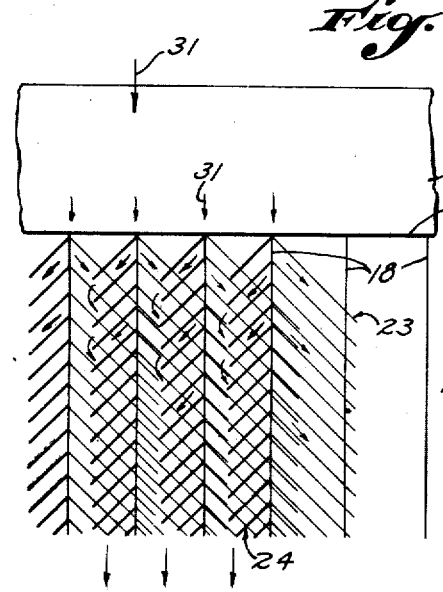
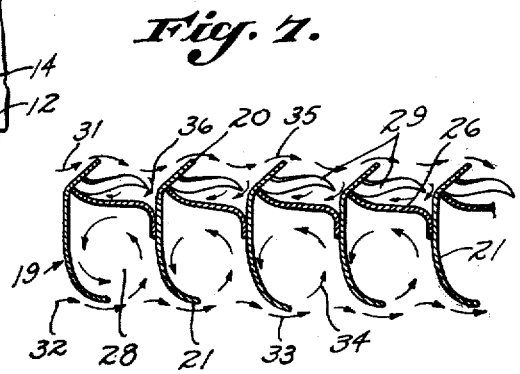
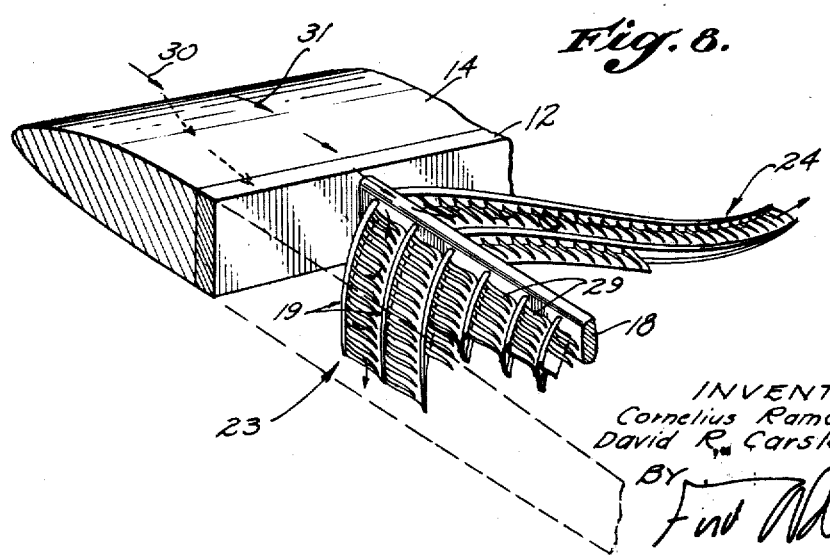
INVENTOR.
Cornelius Ramakers;
David R. Carsley
BY
ATTORNEY Patented May 19, 1931

1,805,722

UNITED STATES PATENT OFFICE

CORNELIUS RAMAKERS AND DAVID R. CARSLEY, OF LOS ANGELES, CALIFORNIA, ASSIGNORS TO SOARING PLANE CORPORATION, A CORPORATION OF CALIFORNIA

AIRPLANE

Application filed June 18, 1929. Serial No. 371,904.

Our invention relates to a construction for an airplane wing in which a plurality of wing elements are used.

Airplanes are supported in the air by the wings thereof, the wings being designed so that the motion of the airplane through the air produces a negative pressure or partial vacuum on the upper side of the wing and a positive pressure on the lower side thereof. The difference in these pressures produces an upward force which supports the airplane. The shape of the wings in an airplane is thus determinative of the lifting capacity of the airplane.

It is an object of our invention to provide an airplane wing of novel construction which provides a greater lifting force per unit area of wing surface than the wings now used. We secure this object by providing a wing which, as it is moved through the air, produces a greater positive pressure on the lower surface of the wing and a greater negative pressure on the upper surface thereof.

It is another object of our invention to provide an airplane wing which requires less power to propel it through the air than the ordinary type. We secure this object by reducing the frictional resistance of the wing with the air.

Further advantages incident to the accomplishment of the above objects are the production of a wing which, when applied to an airplane, requires less horse-power for driving the airplane, permits lower landing and launching speeds, and provides greater stability.

More specifically, our invention comprehends an airplane wing which is composed of a plurality of wing elements joined to form a wing and providing openings therethrough.

In such a construction it is another object of our invention to provide a wing in which air currents impinging on the forward leading portion thereof are directed from the upper side of the wing through the openings and are discharged on the underside of the wing so as to produce a positive pressure on the underside and a negative pressure on the upper side thereof.

It is also an object of our invention to provide a wing of the above construction which has a means for reducing the frictional resistance between the air and the wing in the form of slotted openings on the upper and lower surfaces thereof.

It is a further object of our invention to provide a novel wing element in which a high negative air pressure is produced on the upper side thereof by a novel means and in which friction with the air is greatly reduced.

Further objects of our invention reside in the particular form of construction used, as will be evidenced in the ensuing description.

In the attached drawings we have shown a preferred form of our invention, but it should be understood that we are not limited to this construction. In the drawings,—

Fig. 1 is a plan view of a wing of our construction as applied to an airplane showing the utility thereof.

Fig. 2 is a plan view of two of the wing elements of our invention showing the method of overlapping to form an airplane wing.

Fig. 3 is a partial sectional view taken on the line 3—3 of Fig. 2.

Fig. 4 is a sectional view taken on the line 4—4 of Fig. 2.

Fig. 5 is a sectional view taken on the line 5—5 of Fig. 2.

Fig. 6 is a diagrammatic view of the wing shown in Fig. 1 showing the direction of air currents therein.

Fig. 7 is a section taken the same as Fig. 3 showing the direction of air currents therein.

Fig. 8 is a fragmentary view of the same wing as in Fig. 1 showing the direction of air currents therein.

As best shown in Figs. 1 and 8, we prefer to provide a wing of our construction with a leading portion 11 which constitutes the leading one-third of the wing, though it should be understood that other proportions may be used. The leading portion 11 is of the ordinary aerofoil construction, which includes a longitudinal spar 12 secured at one end to the fuselage 13 of the airplane and located at approximately the forward one-third section of the wing. Supported by the spar 12 and extending forward therefrom are ribs (not shown) over which a skin 14 is secured.

A trailing portion 16 of our invention comprises the remaining two-thirds of the wing and is formed of a plurality of wing elements 17 which are best shown in detail in Figs. 2, 3, 4, and 8 of the drawings. The wing element 17 consists of a longitudinal supporting rib 18 which is secured at one end to the spar 12 and extends toward the rear of the plane, as best shown in Fig. 1. Secured to the rib 18 are blade members 19 having curved upper and lower edges 20 and 21 which make the blade members channel-shaped, as shown in Figs. 3 and 7. The blade members 19 are secured to each side of the rib 18 with the channel openings facing to the rear of the wing at an angle of approximately 45° thereto, primary or short blade members 23 being secured on one side of the rib 18 and secondary or long blade members 24 being secured on the other side thereof, the secondary blade members 24 being approximately twice the length of the primary blade members 23. Secured between the blade members 19 are web members 26 which form upper and lower slots 27 and 28 in the surface of the wing. Secured in the upper slots 27 are fin members 29 which are approximately parallel to the rib 18, and as clearly shown in Fig. 4 have their side surfaces inclined down toward the ends of the slots.

As shown in Fig. 2, the primary blade members 23 of one wing element overlap the secondary blade members 24 of another wing element so as to form a wing of the type shown in Fig. 1.

When a wing of our construction is moved through the air, air currents 30 impinging on the forward leading portion of the wing 11 are divided, as shown in Figs. 7 and 8, into upper air currents 31 and lower air currents 32. The lower air currents 32 pass under the leading portion 11 of the wing and impinge upon the lower edges 21 of the blade members 19, a portion 33 thereof being deflected from the lower edges 21 and another portion forming rotating air currents 34 in the lower slots 28. Due to the lower air currents 32 striking the lower edges 21 of the blades 19 at an angle, the air currents 34 in the lower slots 28 are given a slight motion along the slots 28 and discharged from the trailing ends thereof at an angle of approximately 45° to the direction of motion of the wing. The air is thus discharged in a series of jets which produces a reaction force on the wing, the reaction force having a component that tends to move the wing in a forward direction.

The upper air currents 31 impinge upon the upper edges 20 of the blade members 19, a portion 35 thereof being deflected, and another portion thereof forming rotating air currents 36 in the upper slots 27. The air currents 36 in the upper slots 27 are formed into a spiral by the fins 29, which fins direct the air along the slots 27 and discharge it from the trailing ends thereof, in a series of jets which produces a reaction force on the wing in the same manner as the jets from the lower slots 28. However, due to the fins 29 being in the upper slots 27, the air in these slots is not moved along the slots by the pressure of the impinging air as is the case in the lower slots 28, but is forcibly moved along the upper slots 27 by the fins 29 thus withdrawing the air from the upper slots 27 and forming a partial vacuum on the top of the wing in accordance with an object of our invention.

As best shown in Figs. 5 and 6, the air currents 36 in the slots 27 formed between the primary blade members 23 of one wing element are discharged from the ends thereof onto the secondary blade members 24 of an adjacent wing element where they mingle with the currents in the slots 27 between the secondary blade members 24 and are directed with the air in these slots underneath the primary blade members 23 and thence discharged on the under part of the wing. Air is thus taken from above the wing and introduced below the wing which produces a negative pressure or partial vacuum above the wing and a positive pressure below the wing. When this process of taking air from above the wing and introducing it below the wing is once started, it is amplified by the motion of the airplane and by the currents already formed and continues to further reduce the pressure above the wing and increase the pressure below the wing. Great lifting power is thus provided with a wing of our construction, and the formation of rotating currents of air in the upper and lower slots 27 and 28 of the wing element 17 greatly reduces the air friction between the wing and the air. An airplane equipped with a wing of our construction is thus able to lift a greater weight with the same wing area and requires less horse-power to drive it through the air than when equipped with the usual type of wings.

It is obvious that various modifications can be made in our invention without departing from the broad spirit thereof as set forth in the appended claims.

We claim as our invention:

1. In a wing element for an airplane wing, the combination of: walls defining slots in the upper surface of said wing element, said slots being formed at an angle to the line of motion of said wing element; and means in said slots for directing air currents impinging on the forward leading portion of said wing element along said slots and discharging said air currents from the trailing edges thereof so as to produce a negative pressure on the upper surface of said wing element.

2. In a wing element for an airplane wing, the combination of: walls defining upper and lower slots in the upper and lower surfaces of said wing element, said slots being formed at an angle to the line of motion of said wing element; and means in said upper slots for directing air currents impinging on the forward leading portion of said wing element along said slots and discharging said air currents from the trailing edges thereof so as to produce a negative pressure on the upper surface of said wing element.

3. In a wing element for an airplane wing, the combination of: walls defining slots in the upper surface of said wing element, said slots being formed at an angle to the line of motion of said wing element; and inclined fin members in said slots whereby air currents impinging on the forward leading portion of said wing element are directed along said slots and discharged from the trailing edges thereof so as to produce a negative pressure on the upper surface of said wing element.

4. In a wing element for an airplane wing, the combination of: walls defining upper and lower slots in the upper and lower surfaces of said wing element, said slots being formed at an angle to the line of motion of said wing element; and inclined fin members in said upper slots whereby air currents impinging on the forward leading portion of said wing element are directed along said slots and discharged from the trailing edges thereof so as to produce a negative pressure on the upper surface of said wing element.

5. In a wing element for an airplane wing, the combination of: a supporting member; blade members supported by said supporting member and forming slots in the upper surface of said wing element, said slots being formed at an angle to the line of motion of said wing element; and means in said slots for directing air currents impinging on the forward leading portion of said wing element along said slots and discharging said air currents from the trailing edges thereof so as to produce a negative pressure on the upper surface of said wing element.

6. In a wing element for an airplane wing, the combination of: a supporting member; blade members supported by said supporting member and forming upper and lower slots in the upper and lower surfaces of said wing element, said slots being formed at an angle to the line of motion of said wing element; and means in said upper slots for directing air currents impinging on the forward leading portion of said wing element are directed along said slots and discharging said air currents from the trailing edges thereof so as to produce a negative pressure on the upper surface of said wing element.

7. In a wing element for an airplane wing, the combination of: a longitudinal rib member; blade members supported by said rib member and forming slots in the upper surface of said wing element, said slots being formed at an angle to the line of motion of said wing element; and means in said slots for directing air currents impinging on the forward leading portion of said wing element along said slots and discharging said air currents from the trailing edges thereof so as to produce a negative pressure on the upper surface of said wing element.

8. In a wing element for an airplane wing, the combination of: a longitudinal rib member; blade members supported by said rib member and forming upper and lower slots in the upper and lower surfaces of said wing element, said slots being formed at an angle to the line of motion of said wing element; and means in said upper slots for directing air currents impinging on the forward leading portion of said wing element along said slots and discharging said air currents from the trailing edges thereof so as to produce a negative pressure on the upper surface of said wing element.

9. In a wing element for an airplane wing, the combination of: a supporting member; blade members supported by said supporting member in spaced relationship to each other; web members connecting said blade members and providing slots in the upper surface of said wing element, said slots being formed at an angle to the line of motion of said wing element; and means in said slots whereby air currents impinging on the forward leading portion of said wing element are directed along said slots and discharged from the trailing edges thereof so as to produce a negative pressure on the upper surface of said wing element.

10. In a wing element for an airplane wing, the combination of: a supporting member; blade members supported by said supporting member in spaced relationship to each other; web members connecting said blade members and providing upper and lower slots in the upper and lower surfaces of said wing element, said slots being formed at an angle to the line of motion of said wing element; and means in said upper slots whereby air currents impinging on the forward leading portion of said wing element are directed along said slots and discharged from the trailing edges thereof so as to produce a negative pressure on the upper surface of said wing element.

11. In a wing element for an airplane wing, the combination of: walls defining slots in the upper surface of said wing element, said slots being formed at an angle of approximately 45° to the line of motion of said wing element; and means in said slots for directing air currents impinging on the forward leading portion of said wing element along said slots and discharging said air currents from the trailing edges thereof so as to produce a negative pressure on the upper surface of said wing element.

12. In a wing element for an airplane wing, the combination of: walls defining upper and lower slots in the upper and lower surfaces of said wing element, said slots being formed at an angle of approximately 45° to the line of motion of said wing element; and means in said upper slots for directing air currents impinging on the forward leading portion of said wing element along said slots and discharging said air currents from the trailing edges thereof so as to produce a negative pressure on the upper surface of said wing element.

13. In an airplane wing, the combination of: a plurality of wing elements disposed so as to overlap one another and forming openings therebetween; and means in said slots inclined to the axis thereof for directing air currents impinging on the forward leading portion of said wing along said openings and discharging said air currents on the under side of said wing so as to produce a positive air pressure on the under side of said wing and a negative pressure on the upper side thereof.

14. In an airplane wing, the combination of: a plurality of wing elements having slots in the upper surfaces thereof, primary portions of said wing elements overlapping secondary portions of other wing elements; and means disposed at an inclination to the walls of said slots for directing air currents impinging on the forward leading portion of said wing along said slots between said primary and secondary portions and discharging said air currents on the under side of said wing so as to produce a positive air pressure on the under side of said wing and a negative pressure on the upper side thereof.

15. In an airplane wing, the combination of: a plurality of wing elements disposed so as to overlap one another and forming openings therebetween; and means in said openings adapted to direct air currents impinging on the forward leading portion of said wing along said openings and discharging said air currents on the under side of said wing so as to produce a positive air pressure on the under side of said wing and a negative pressure on the upper side thereof.

16. In an airplane wing, the combination of: a plurality of wing elements having slots in the upper surfaces thereof, primary portions of said wing elements overlapping secondary portions of other wing elements; and means in said slots for directing air currents impinging on the forward leading portion of said wing along said slots between said primary and secondary portions and discharging said air currents on the under side of said wing so as to produce a positive air pressure on the under side of said wing and a negative pressure on the upper side thereof.

17. In an airplane wing, the combination of: a plurality of transverse supporting members; primary blade members secured to a side of said supporting members; secondary blade members secured to an opposite side of said supporting members; a portion of said secondary blade members being overlapped by said primary blade members, said blade members providing upper and lower slots in upper and lower surfaces of said wing; and means whereby air currents impinging on the forward leading portion of said wing are directed along said upper slots and discharged on the under side of said wing so as to produce a positive air pressure on the under side of said wing and a negative pressure on the upper side thereof.

18. In an airplane wing, the combination of: a plurality of transverse supporting members; primary blade members secured to a side of said supporting members; secondary blade members secured to an opposite side of said supporting members; a portion of said secondary blade members being overlapped by said primary blade members, said blade members providing upper and lower slots in upper and lower surfaces of said wing; and means in said upper slots whereby air currents impinging on the forward leading portion of said wing are directed along said upper slots and discharged on the under side of said wing so as to produce a positive air pressure on the under side of said wing and a negative pressure on the upper side thereof.

19. In an airplane wing, the combination of: a plurality of transverse supporting members; primary blade members secured to a side of said supporting members; secondary blade members secured to an opposite side of said supporting members; a portion of said secondary blade members being overlapped by said primary blade members, said blade members providing upper and lower slots in upper and lower surfaces of said wing; and fin members in said upper slots whereby air currents impinging on the forward leading portion of said wing are directed along said upper slots and discharged on the under side of said wing so as to produce a positive air pressure on the under side of said wing and a negative pressure on the upper side thereof.

20. In a wing element for an airplane wing, the combination of: walls defining slots in the upper surface of said wing element, said walls being formed at an angle to the line of motion of air currents impinging upon said surface so that said air currents impart a rotary motion to the air in said slots; and means in said slots inclined to the axis thereof for engaging said rotating air in said slots and directing it along said slots so as to discharge said air from the trailing edges thereof and produce a negative pressure on the upper surface of said wing element.

21. In a wing element for an airplane wing, the combination of: walls defining slots in the upper surface of said wing element, said walls being formed at an angle to the line of motion of air currents impinging upon said upper surface so that said air currents impart a rotary motion to the air in said slots; and means in said slots for engaging said rotating air and directing it along said slots in a manner to discharge said air from the trailing edges thereof and produce a negative pressure on the upper surface of said wing element.

22. In a wing element for an airplane wing, the combination of: walls defining slots in the upper surface of said wing element, said walls being disposed at an angle to the line of motion of air currents impinging upon said upper surface so that said air currents impart a rotary motion to the air in said slots; and inclined fin members in said slots adapted to engage said rotating air currents so as to discharge them from the trailing edges of said slots and produce a negative pressure on the upper surface of said wing element.

23. In a wing element for an airplane wing, the combination of: walls defining slots in the upper surface of said wing element, said walls being formed at an angle to the line of motion of air currents impinging upon said upper surface in a manner that said air currents impart a rotary motion to the air in said slots; and inclined fins disposed in said slots and adapted to engage said rotating air in said slots for directing it along said slots so as to be discharged from the trailing edges thereof, to produce a negative pressure on the upper surface of said wing element.

In testimony whereof, we have hereunto set our hands at Los Angeles, California, this 13th day of June, 1929.

CORNELIUS RAMAKERS.
DAVID R. CARSLEY.

21. In a wing element for an airplane wing, the combination of: walls defining slots in the upper surface of said wing element, said walls being formed at an angle to the line of motion of air currents impinging upon said upper surface so that said air currents impart a rotary motion to the air in said slots; and means in said slots for engaging said rotating air and directing it along said slots in a manner to discharge said air from the trailing edges thereof and produce a negative pressure on the upper surface of said wing element.

22. In a wing element for an airplane wing, the combination of: walls defining slots in the upper surface of said wing element, said walls being disposed at an angle to the line of motion of air currents impinging upon said upper surface so that said air currents impart a rotary motion to the air in said slots; and inclined fin members in said slots adapted to engage said rotating air currents so as to discharge them from the trailing edges of said slots and produce a negative pressure on the upper surface of said wing element.

23. In a wing element for an airplane wing, the combination of: walls defining slots in the upper surface of said wing element, said walls being formed at an angle to the line of motion of air currents impinging upon said upper surface in a manner that said air currents impart a rotary motion to the air in said slots; and inclined fins disposed in said slots and adapted to engage said rotating air in said slots for directing it along said slots so as to be discharged from the trailing edges thereof, to produce a negative pressure on the upper surface of said wing element.

In testimony whereof, we have hereunto set our hands at Los Angeles, California, this 13th day of June, 1929.

CORNELIUS RAMAKERS.
DAVID R. CARSLEY.

CERTIFICATE OF CORRECTION.

Patent No. 1,805,722.   Granted May 19, 1931, to

CORNELIUS RAMAKERS ET AL.

It is hereby certified that error appears in the printed specification of the above numbered patent requiring correction as follows: Page 3, line 56, claim 6, strike out the words "are directed"; and that the said Letters Patent should be read with this correction therein that the same may conform to the record of the case in the Patent Office.

Signed and sealed this 7th day of July, A. D. 1931.

(Seal)

M. J. Moore,
Acting Commissioner of Patents.

CERTIFICATE OF CORRECTION.

Patent No. 1,805,722.   Granted May 19, 1931, to

CORNELIUS RAMAKERS ET AL.

It is hereby certified that error appears in the printed specification of the above numbered patent requiring correction as follows: Page 3, line 56, claim 6, strike out the words "are directed"; and that the said Letters Patent should be read with this correction therein that the same may conform to the record of the case in the Patent Office.

Signed and sealed this 7th day of July, A. D. 1931.

(Seal)

M. J. Moore,
Acting Commissioner of Patents.